No. 733,848. PATENTED JULY 14, 1903.
W. L. KENNEDY.
FERTILIZER DISTRIBUTER AND SEED DRILL.
APPLICATION FILED DEC. 19, 1902.
NO MODEL. 4 SHEETS—SHEET 1.
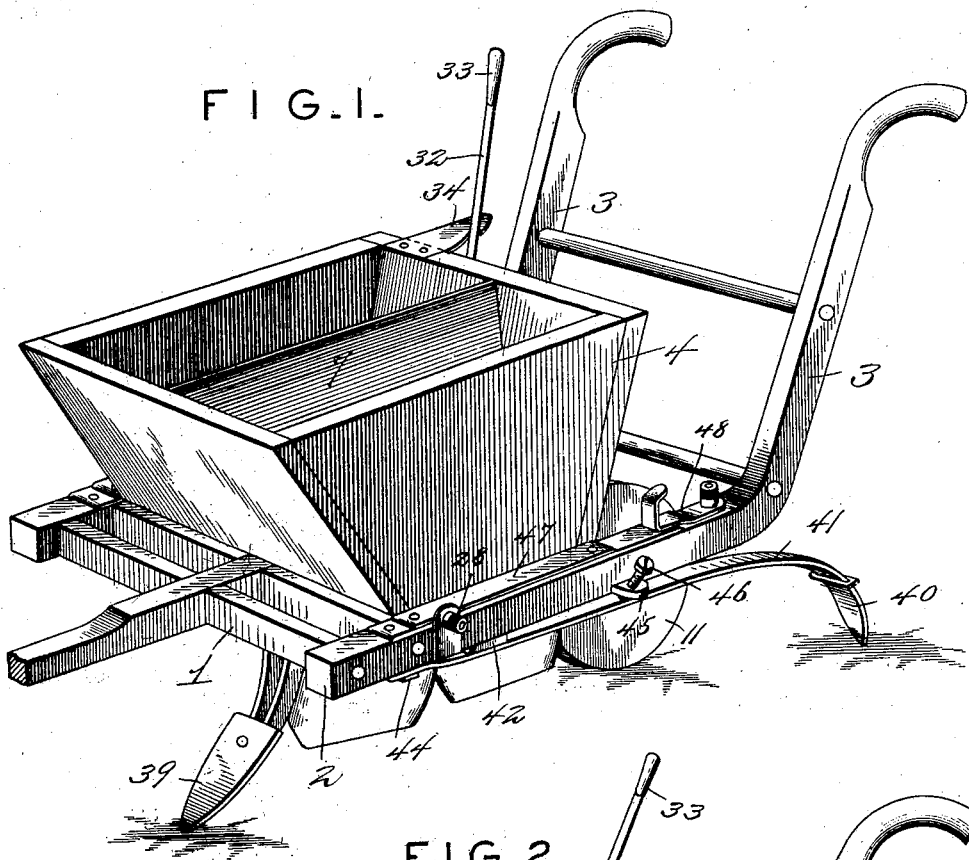
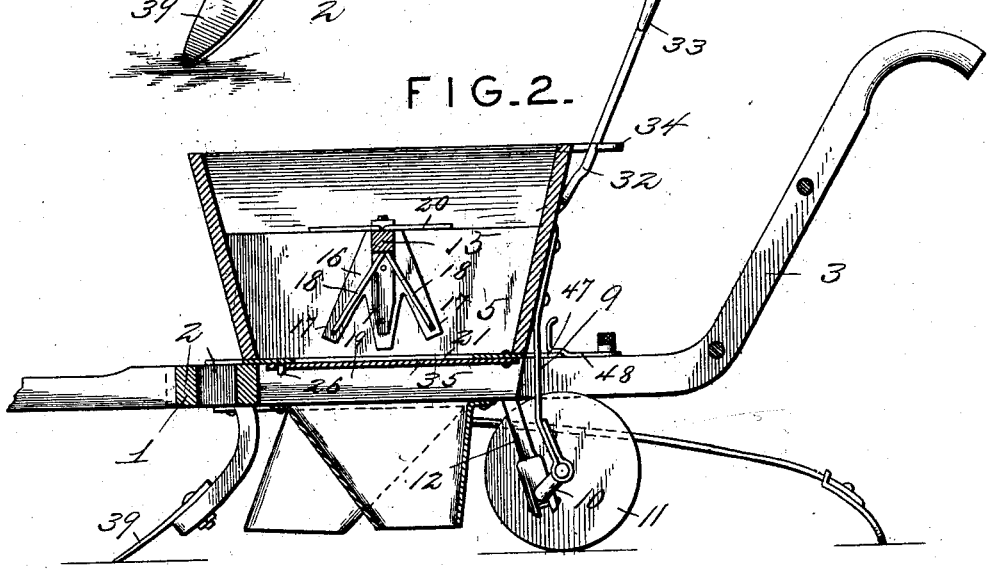
WITNESSES:
INVENTOR
William L. Kennedy.
BY Victor J. Evans
Attorney No. 733,848. PATENTED JULY 14, 1903.
W. L. KENNEDY.
FERTILIZER DISTRIBUTER AND SEED DRILL.
APPLICATION FILED DEC. 19, 1902.
NO MODEL. 4 SHEETS—SHEET 2.

WITNESSES:

INVENTOR
William L. Kennedy.
By Victor J. Evans
Attorney

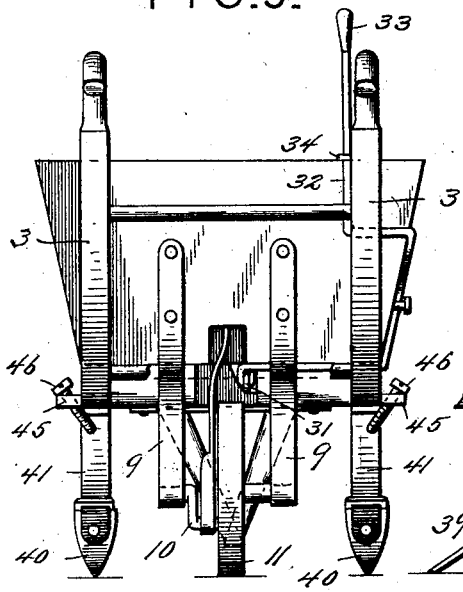
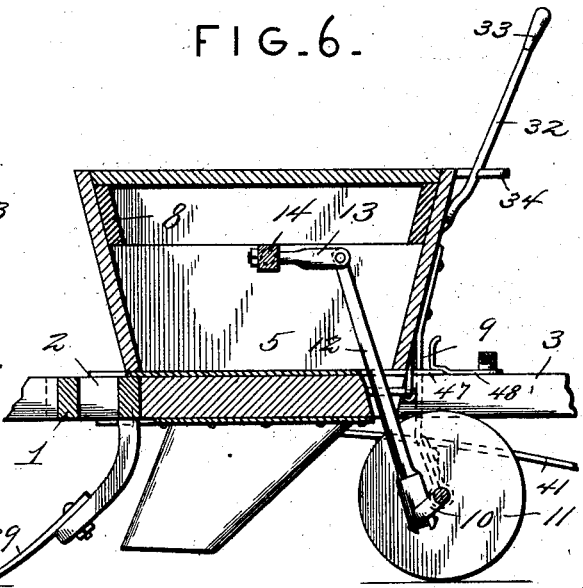
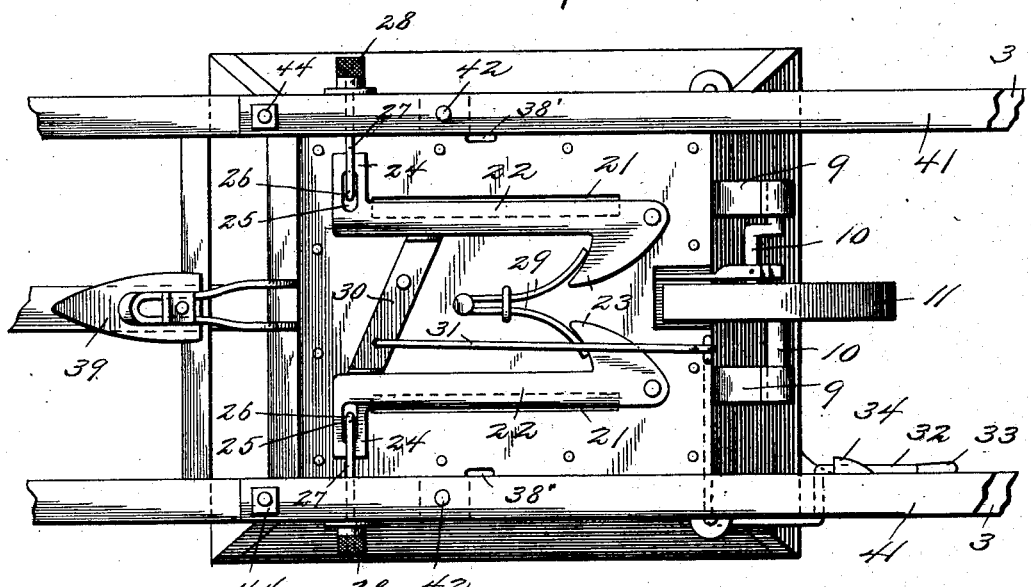
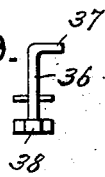

No. 733,848. PATENTED JULY 14, 1903.
W. L. KENNEDY.
FERTILIZER DISTRIBUTER AND SEED DRILL.
APPLICATION FILED DEC. 19, 1902.
NO MODEL. 4 SHEETS—SHEET 4.

Inventor
William L. Kennedy

Witnesses
Harry L. Amer.
Herbert D. Lawson

By Victor J. Evans,
Attorney

No. 733,848. Patented July 14, 1903.

UNITED STATES PATENT OFFICE.

WILLIAM L. KENNEDY, OF HAY, GEORGIA, ASSIGNOR OF ONE-HALF TO JEFF M. COLE, OF PIN, GEORGIA.

FERTILIZER-DISTRIBUTER AND SEED-DRILL.

SPECIFICATION forming part of Letters Patent No. 733,848, dated July 14, 1903.

Application filed December 19, 1902. Serial No. 135,927. (No model.)

*To all whom it may concern:*

Be it known that I, WILLIAM L. KENNEDY, a citizen of the United States, residing at Hay, in the county of Paulding and State of Georgia, have invented new and useful Improvements in Fertilizer-Distributers and Seed-Drills, of which the following is a specification.

My invention relates to improvements in combined fertilizer-distributers and seed-drills; and the objects of the same are to provide a hopper having oppositely-disposed compartments therein, from which extend inwardly-inclined feed spouts or boots adapted to deposit the fertilizer or seed in a line directly in rear of the plow or furrow-opener.

A further object is to employ a cut-off for the bottom of each of the compartments, said cut-offs being adapted to be operated independently of each other or simultaneously by means of a lever arranged at the rear of the machine.

Another object is to arrange an agitator of peculiar construction within each compartment, whereby the contents of said compartment may be thoroughly mixed and are prevented from clogging the outlet therefrom.

A further object is to provide furrow-coverers at each side of the rear of the machine, the same having means whereby they may be adjusted from or toward the furrow.

Other objects are to provide means whereby the agitators may be operated from a wheel connected to the hopper and to employ a removable bottom, whereby access may be had to the cut-offs and their operating mechanism.

With the above and other objects in view the invention consists in the further novel construction and combination of parts hereinafter more fully described and claimed, and illustrated in the accompanying drawings, showing the preferred form of my invention, and in which—

Figure 3:
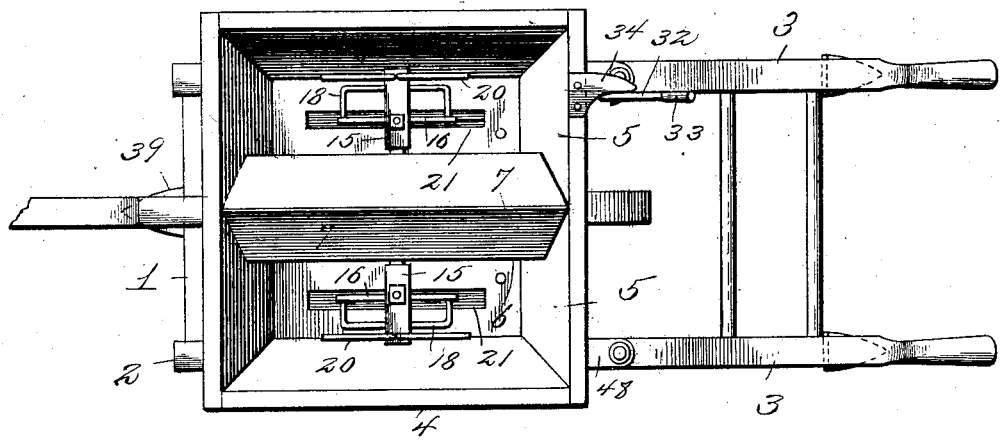
Figure 4:
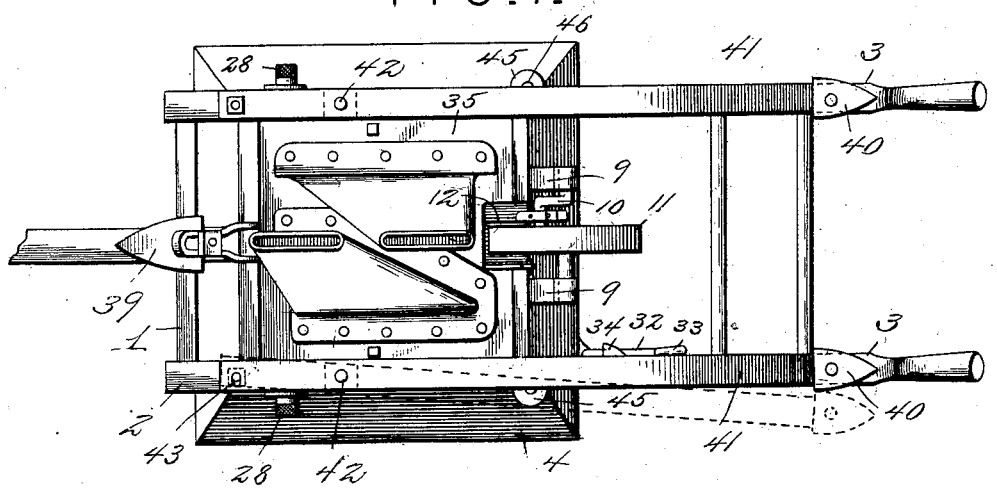
Figure 8:
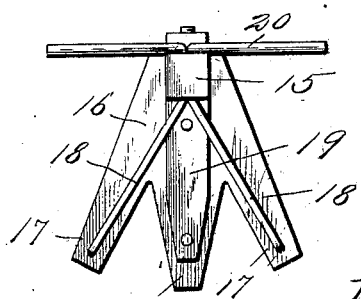
Figure 10:
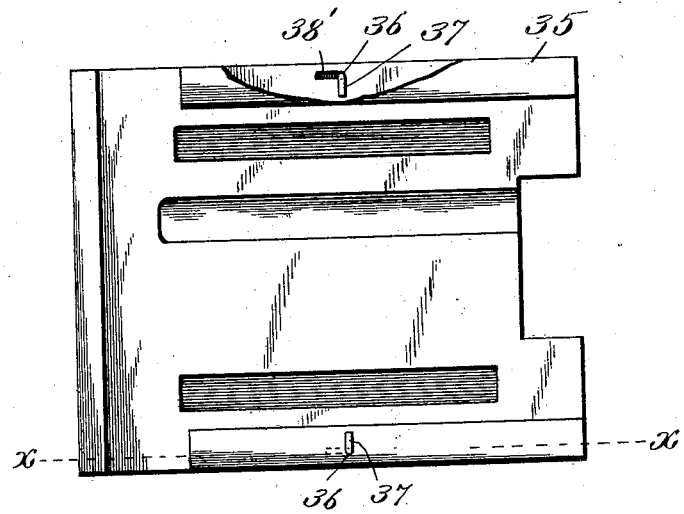
Figure 11:
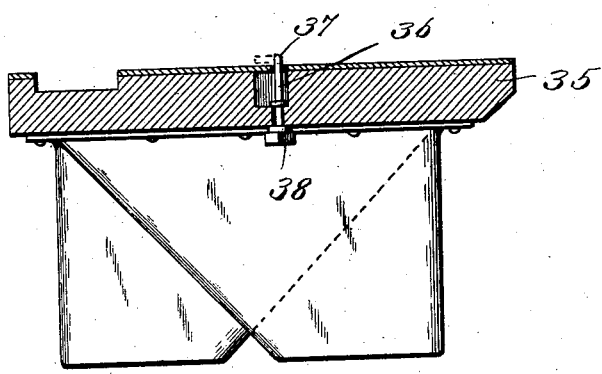

Figure 1 is a perspective view of my improved fertilizer-distributer and seed-drill. Fig. 2 is a longitudinal section therethrough at one side of the central partition in the hopper. Fig. 3 is a plan view. Fig. 4 is a bottom view. Fig. 5 is a rear elevation. Fig. 6 is a central longitudinal section through the hopper and the adjacent portions of the machine. Fig. 7 is an enlarged bottom view of the hopper with the detachable bottom removed. Fig. 8 is a detail view of one of the agitators detached. Fig. 9 is a detail view of locking means employed for securing together the two bottoms of the hopper. Fig. 10 is a plan view of the detachable bottom of the hopper and showing a portion of the rigid bottom of said hopper fastened thereto; and Fig. 11 is a section on line $x\ x$, Fig. 10.

Referring to the figures by numerals of reference, 1 is the frame of the machine, the side bars 2 thereof having handles 3 extending upward from their rear ends. Arranged upon this frame and between the frame-bars is a hopper 4, having two similar compartments 5 therein arranged at opposite sides of a partition 6. This partition is hollow, as shown in Fig. 6, the upper portions 7 of the sides thereof being tapered toward each other and supported upon end blocks 8, arranged within the partition and upon the ends of the hopper. Hangers 9 extend downward from the rear of the hopper, and journaled between the lower ends thereof is a crank-shaft 10, having a wheel 11, keyed or otherwise secured thereto. The crank upon the shaft is connected, by means of a pitman 12, to an arm 13, arranged within the partition 6 and extending downward from a rock-shaft 14, journaled within the partition and extending into each of the compartments 5. To each end of this shaft 14 is fastened a head 15 of an agitator of peculiar construction. This agitator comprises a plate 16, which extends downward from the head 15 and has three prongs 17 extending therefrom, said prongs being of such length as to come to points adjacent to the bottom of the hopper. Brace-rods 18 also extend downward from the head of each agitator and are connected to the end prongs 17, the central prong being strengthened by means of a strap 19, connected to said head. Arms 20 project laterally from the top of the head, as illustrated in the drawings.

A slot 21 is formed longitudinally within the center of the bottom of each compartment 5 in the hopper and in vertical alinement with the agitator in said compartment. Each of these slots is normally closed by a cut-off 22, formed of a strip of sheet metal pivoted at one end and having an arm 23 extending inwardly therefrom at a point adjacent to said pivot. At the opposite end of the cut-off is a lateral extension 24, having a slot 25 therein for the reception of the hooked end 26 of a screw-threaded rod 27. This rod is slidably mounted within the adjacent side bar 2, and a thumb-nut 28 is mounted upon the outer end thereof and normally bears upon said side bars. A V-shaped spring end 29 is interposed between the two cut-offs 22 and is fastened to the bottom of the hopper. The free ends of this spring bear upon the two arms 23 of the cut-offs and serve to hold said cut-offs normally removed from under the slots 21. A strip 30 is fulcrumed off of its center upon the bottom of the hopper at a point intermediate the forward ends of the two cut-offs, and this strip is of such length that the two ends thereof can be brought simultaneously into contact with the inner edges of the two cut-offs, and thereby move the same in position under the slots 21. This strip is operated by means of a rod 31, which is connected to the inwardly-turned end of a lever 32, fulcrumed upon the bottom of the hopper at the rear thereof. This lever extends upward in rear of the hopper and is provided with a handle 33, whereby the same may be readily moved back and forth by the operator. A catch 34 may be provided upon the rear of the hopper for locking the lever in position after the cut-offs have been closed and the spring 29 placed under tension thereby.

The hopper is provided with a detachable bottom 35, which is adapted to fit snugly between the side bars 2 and the front and rear cross-bars of the hopper-frame, and this bottom is secured in position by means of rods 36, swiveled in opposite sides thereof and having hooked inner ends 37, adapted to extend into slots 38', formed within the bottom of the compartments 5. A head 38 is arranged at the lower end of each of these rods and by means thereof the hooked ends of the rods can be turned at right angles to the slots 38' after they have been inserted therein. This lower or second bottom 35 is provided with recesses at suitable points in the upper face thereof to receive the cut-offs and the various parts adjacent thereto, and it serves to protect the same from dust or other material that would clog or otherwise affect the operation of the parts.

A plow or furrow-opener 39 is arranged at the front of the hopper and below the same, and furrow-coverers 40 are provided at the rear of the hopper. These coverers are secured to the rear ends of spring-strips 41, which extend under the side bars 2 and are pivoted thereto, as shown at 42. The forward ends of the strips are provided with transverse slots 43, through which extend set-screws 44, whereby the strips may be locked against movement upon their fulcrums 42. An ear 45 extends laterally from each side bar 2 and at a point adjacent to the rear end thereof, and within the same is mounted an inclined adjusting-screw 46, which is adapted to bear upon the strip. By means of these screws the pressure of the furrow-coverers upon the ground may be regulated.

The hopper of the machine is not secured rigidly to the frame thereof, but is fastened to spring-metal straps 47, arranged along the sides thereof. These straps are fastened at their forward ends in any suitable manner to the side bars 2, while the rear ends thereof are adapted to be clamped upon said side bars by means of pivoted catches 48 thereon. By releasing these straps from the catches it is obvious that the machine can be moved over rough ground without jarring the hands grasping the handles 3, because the straps 47 serve the purposes of springs and act as cushions for the handles.

In operation as the machine is drawn over the ground and the furrows are opened thereby wheel 11 will rotate and impart an oscillating motion to the arm 13 and the agitators upon the rocking shaft 14. When it is desired to discharge the contents of the compartments 5 through the slots 21, lever 32 is released from engagement with catch 34, and the spring 29 serves to promptly throw the cut-offs 22 from under said slots. If desired, however, one of these cut-offs may be retained in position by screwing the nut 28 upon rod 27, connected therewith, until the hook 26 upon said rod has been drawn to the end of slot 25. To close the slots 21, it is merely necessary to swing the lever 32 into engagement with catch 34. Strap 30 will then force the cut-offs in opposite directions and bring them into position under the slots.

In the foregoing description I have shown the preferred form of my invention, but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a planter of the character described, the combination with a hopper having an outlet in the bottom thereof; of a cut-off pivoted to the bottom, means for holding the cut-off normally removed from under the outlet, a lever fulcrumed upon the hopper, and a strip pivoted adjacent to the cut-off and connected to the lever.

2. In a planter of the character described, the combination with a hopper having an outlet in the bottom thereof; of a cut-off pivoted adjacent to said outlet, a spring for holding the cut-off normally removed from under the outlet, a strip fulcrumed to the bottom of the hopper and bearing at one end upon said cut-off, a lever, means connecting said lever and strip, and a hooked rod adjustably connected to the hopper and engaging a slot in the cut-off.

3. In a planter of the character described, the combination with a hopper having parallel compartments therein, and an outlet in the bottom of each compartment; of a cut-off pivoted to the bottom of the hopper adjacent to each of the outlets, an inwardly-extending arm to each cut-off, a spring bearing upon the arms and adapted to hold the cut-offs normally removed from under the outlets, a strip pivoted to the bottom of the hopper and between the cut-offs, a lever, and means connecting said lever and strip.

4. In a planter of the character described, the combination with a hopper having compartments therein, and an outlet in the bottom of each compartment; of a cut-off pivoted to the bottom adjacent to each outlet, a spring for holding the cut-offs normally removed from under the outlets, hooked rods adjustably connected to opposite sides of the hopper and engaging slots within the cut-offs, and means for moving said cut-offs simultaneously into position below the outlets.

5. In a planter of the character described, the combination with a hopper having compartments therein, and an outlet in the bottom of each compartment; of a cut-off pivoted to the bottom at a point adjacent to each outlet, inwardly-extending arms to the cut-offs, a spring bearing thereon and adapted to hold the cut-offs normally removed from under the outlets, means for locking either or both of the cut-offs in position below the outlets, a strip pivoted to the hopper between the outlets and adapted to bear at opposite ends upon the cut-offs, a lever, a rod connecting said lever and strip, and a detachable bottom section secured under the cut-offs and their operating mechanism, said bottom having boots for the guidance of material discharged from the outlets.

6. In a planter of the character described, the combination with a frame having spring-hinges thereon, and a hopper secured to said hinges; of a hollow partition within the hopper, a shaft journaled therein, a wheel connected to and extending below the hopper, a crank-shaft revoluble with the wheel, an arm extending from the shaft in the partition, a bottom connecting said arm and the crank-shaft, and an agitator secured at each end of the shaft journaled in the partition.

7. In a planter of the character described, the combination with a frame having a hopper mounted thereon, an outlet in the hopper, and cut-off mechanism below the hopper; of pivoted spring-strips extending rearwardly from opposite sides of the hopper, and having furrow-coverers at the ends thereof, means for locking said strips in adjusted position, and an adjusting-screw bearing upon each strip.

In testimony whereof I affix my signature in presence of two witnesses.

WILLIAM L. KENNEDY.

Witnesses:
JOHN F. RAGAN,
B. S. KILGOUR.